United States Patent
Nakashima et al.

(10) Patent No.: US 10,547,832 B2
(45) Date of Patent: Jan. 28, 2020

(54) IMAGE PROCESSING APPARATUS, METHOD, AND STORAGE MEDIUM FOR EXECUTING GRADATION ON STEREOSCOPIC IMAGES

(71) Applicant: CANON KABUSHIKI KAISHA, Tokyo (JP)

(72) Inventors: Satoshi Nakashima, Kawasaki (JP); Yoichi Kashibuchi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 15/588,035

(22) Filed: May 5, 2017

(65) Prior Publication Data
US 2017/0337712 A1 Nov. 23, 2017

(30) Foreign Application Priority Data

May 18, 2016 (JP) .................................. 2016-099904
Feb. 16, 2017 (JP) .................................. 2017-027296

(51) Int. Cl.
*H04N 13/315* (2018.01)
(52) U.S. Cl.
CPC ................................ *H04N 13/315* (2018.05)
(58) Field of Classification Search
CPC ...... G06T 5/007; G09G 3/003; H04N 13/315; H04N 13/332–334; H04N 13/361
See application file for complete search history.

(56) References Cited

U.S. PATENT DOCUMENTS

| 5,233,458 A * | 8/1993 | Moffitt | G02B 23/18 351/201 |
| 2006/0012759 A1* | 1/2006 | Matsushita | G03B 21/14 353/94 |
| 2006/0227396 A1* | 10/2006 | Sugimoto | H04N 1/4074 358/521 |
| 2012/0154555 A1* | 6/2012 | Iwanaka | G09G 3/003 348/51 |
| 2014/0035972 A1* | 2/2014 | Hasegawa | H04N 13/366 345/694 |

FOREIGN PATENT DOCUMENTS

| JP | 2003-337299 A | 11/2003 |
| JP | 2003337299 A | * 11/2003 |

* cited by examiner

*Primary Examiner* — Diane M Wills
(74) *Attorney, Agent, or Firm* — Canon U.S.A., Inc. IP Division

(57) ABSTRACT

The aspect of the embodiments is directed to an image processing apparatus capable of executing gradation processing according to various shapes of boundary portions by determining start positions for starting the gradation processing for applying a gradient to a luminance value in a horizontal direction of an image in positions in a vertical direction of the image.

19 Claims, 19 Drawing Sheets

LEFT-EYE DISPLAY IMAGE

RIGHT-EYE DISPLAY IMAGE

COMBINED IMAGE IN USER'S HEAD

FIG.2
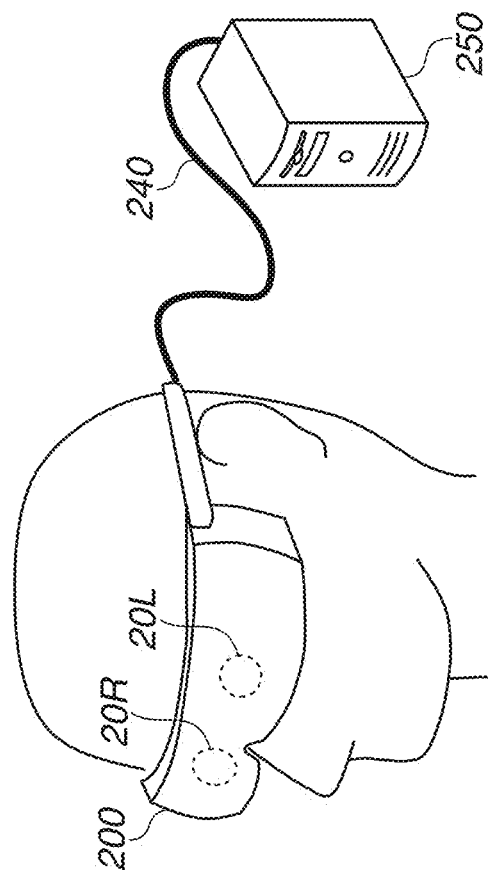
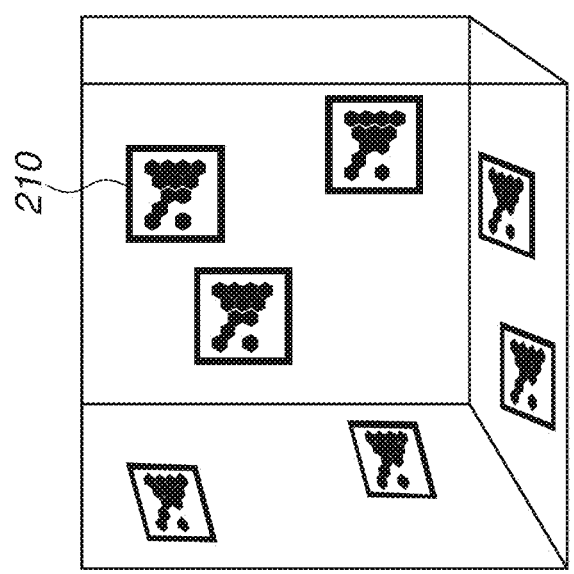

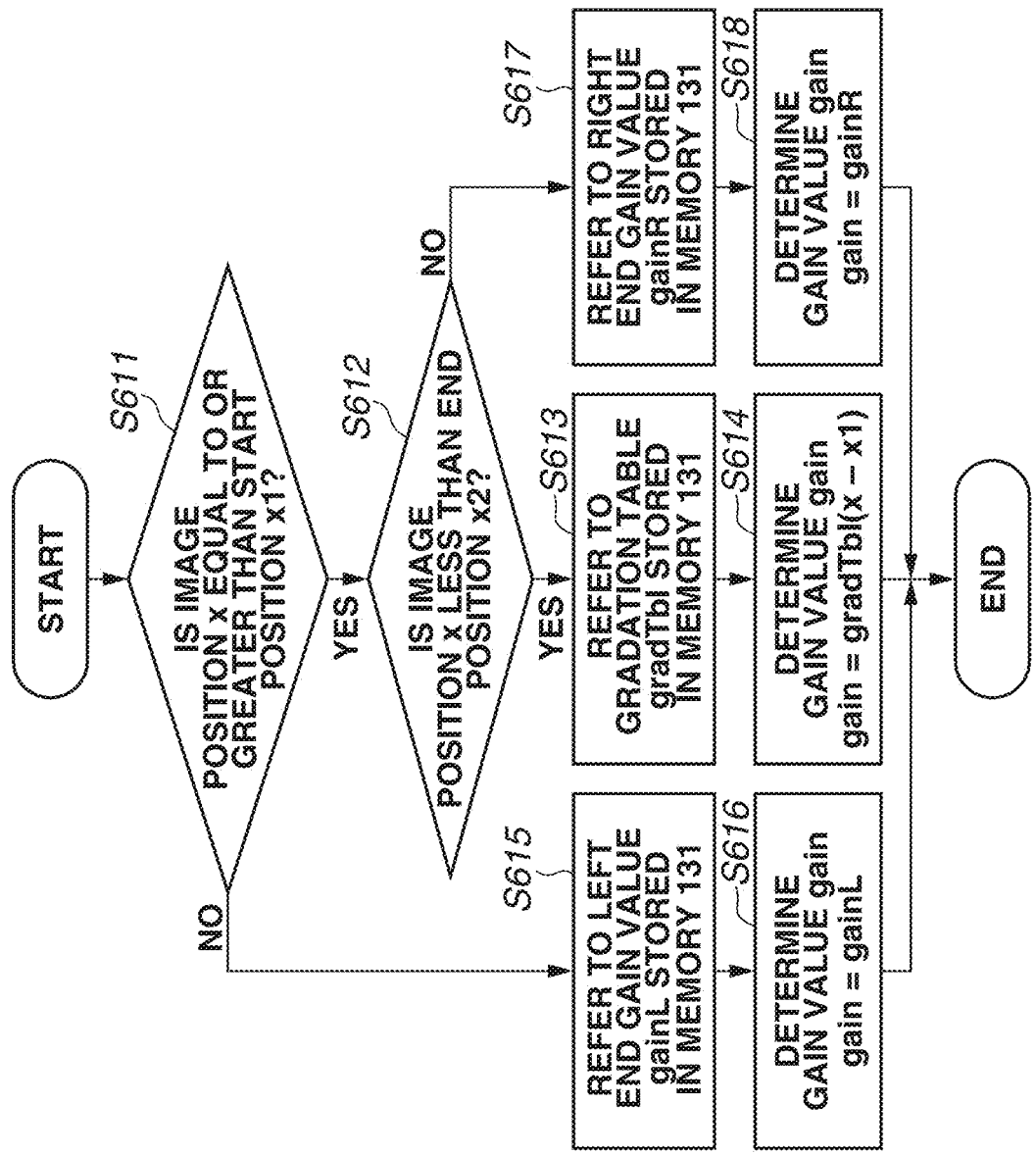
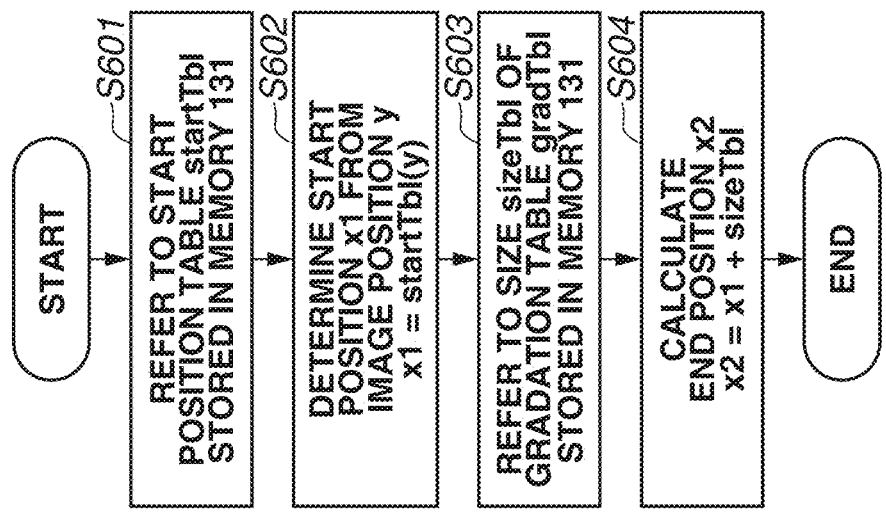

START POSITION TABLE

GRADATION TABLE

LEFT-EYE DISPLAY IMAGE

RIGHT-EYE DISPLAY IMAGE

COMBINED IMAGE IN USER'S HEAD

LEFT-EYE
DISPLAY IMAGE

ENLARGED
PORTION

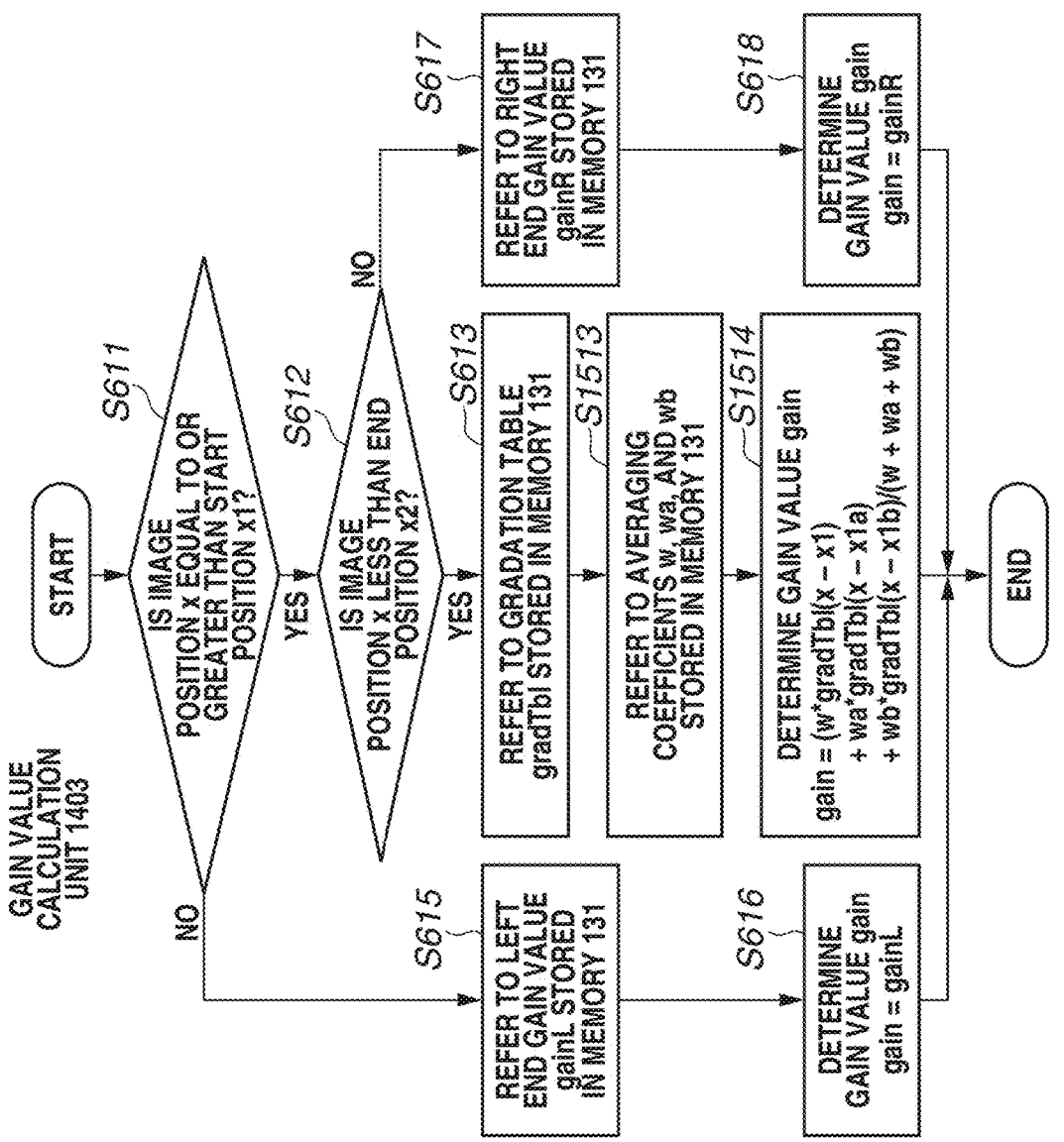
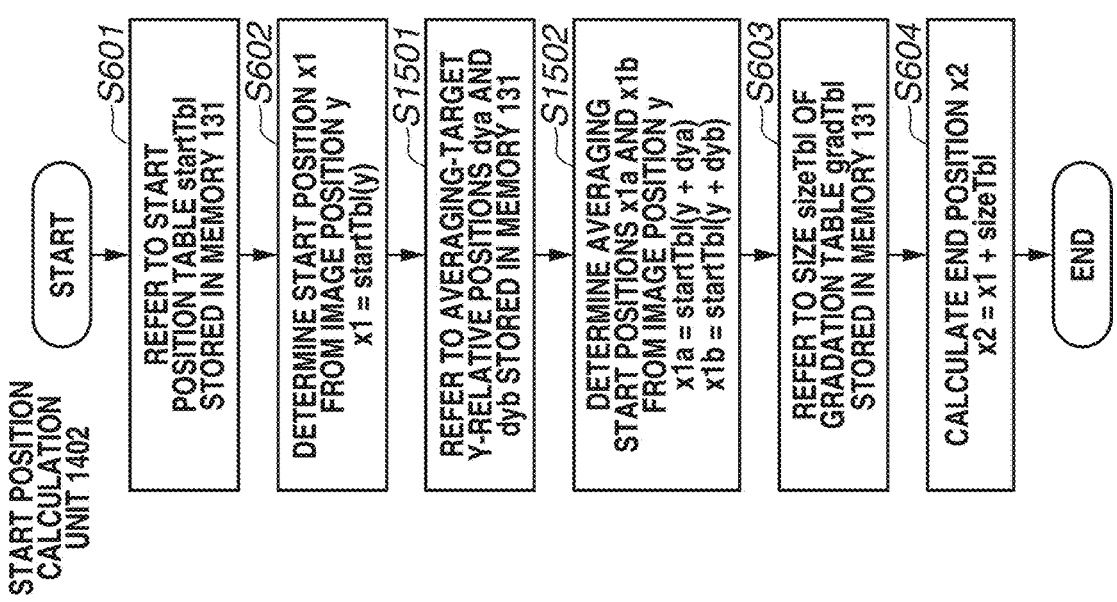

FIG.16A
LEFT-EYE
DISPLAY IMAGE
FIG.16B
ENLARGED
PORTION
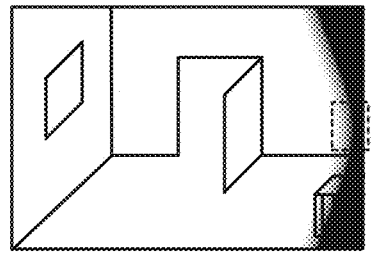
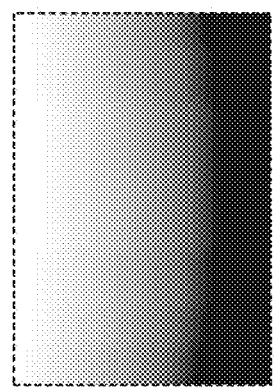

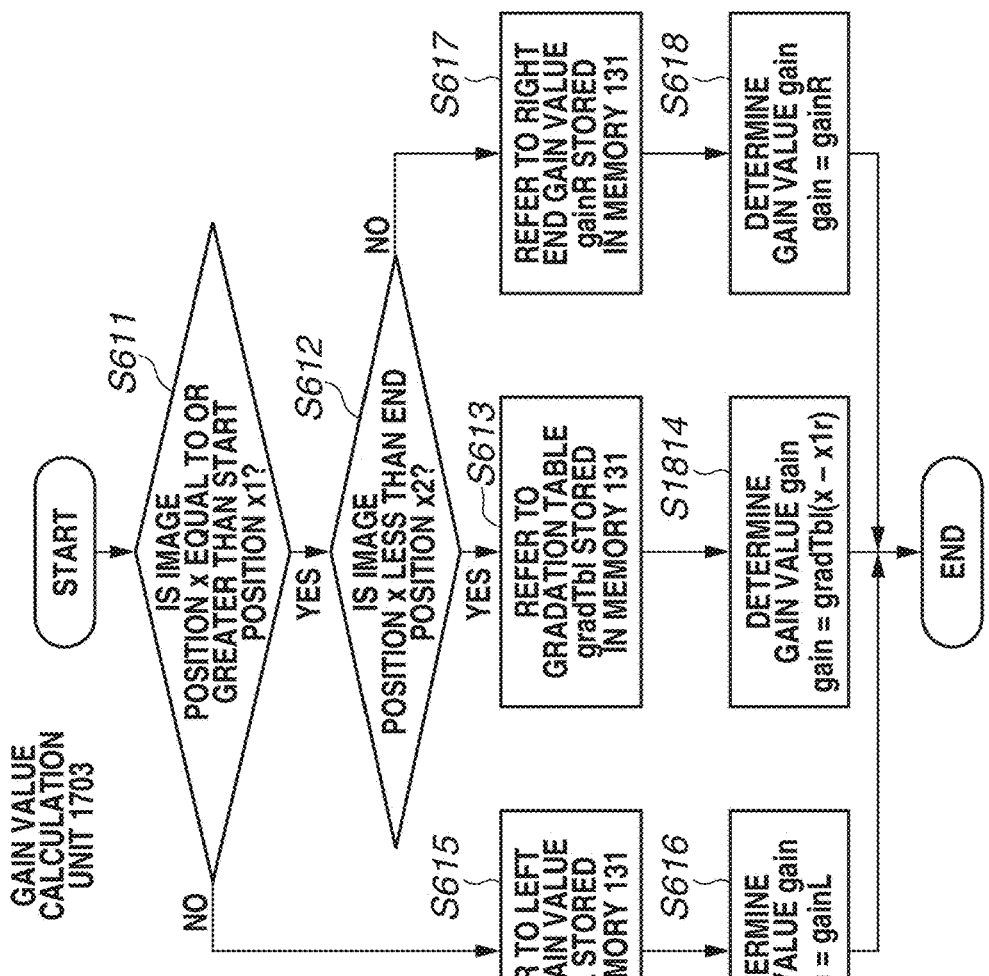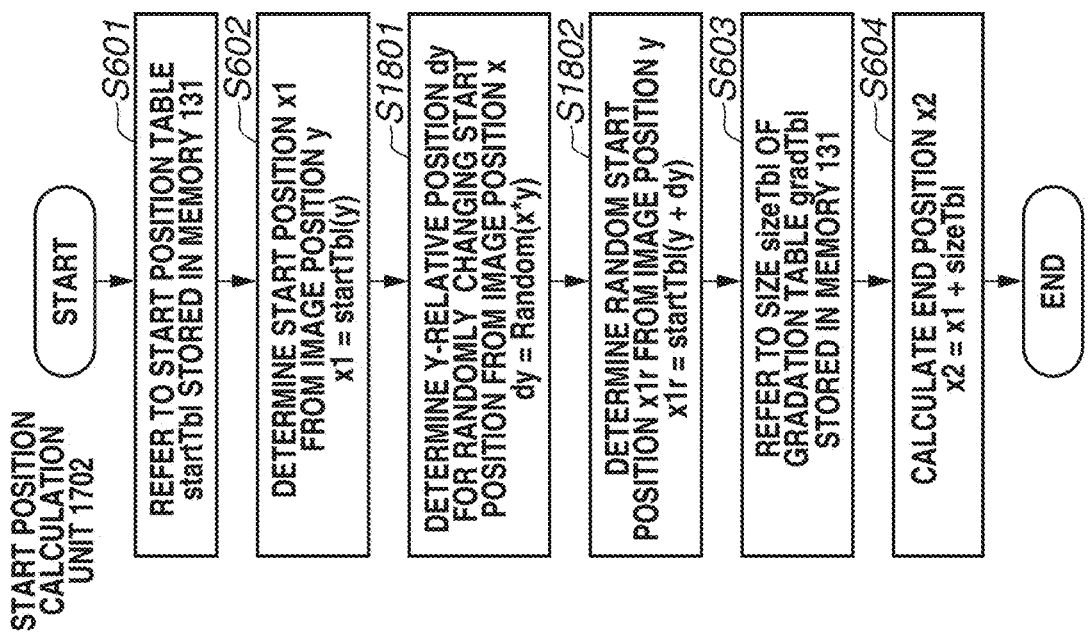

LEFT-EYE DISPLAY IMAGE

ENLARGED PORTION

IMAGE PROCESSING APPARATUS, METHOD, AND STORAGE MEDIUM FOR EXECUTING GRADATION ON STEREOSCOPIC IMAGES

BACKGROUND OF THE INVENTION

Field of the Invention

The aspect of the embodiments relates to a technique for executing gradation processing on at least one image from among a plurality of images displayed on a plurality of display units.

Description of the Related Art

In recent years, a technique known as "mixed reality (MR)" has been known as a technique for seamlessly combining a real world and a virtual world. There has been known an MR technique using a video see-through head-mounted display (HMD). In the above technique, an object image which substantially conforms to an object observed from a position of the pupil of a user who wears an HMD is captured by a camera. Then, the captured image on which a computer graphics (CG) is superimposed and displayed is displayed on a display device such as a liquid crystal display or an organic electroluminescence (EL) display, so that the user who wears the HMD can observe the displayed image.

In order to enable the user to naturally conduct observation with an increased sense of presence, an image display apparatus used for the HMD displays a wide-angle image. There is provided an image display apparatus using a technique for achieving display of a wide-angle image. In the technique, images having different view angles are displayed as a right-eye image and a left-eye image, and only a part of the right-eye and the left-eye view angles are overlapped with each other, so that the user can observe an image with a view angle wider than in a case of displaying images with the same view angle as the right-eye image and the left-eye image.

However, when the images with different view angles are displayed with respect to the right and the left eyes while only a part of the right-eye and the left-eye view angles are overlapped with each other, there arises a phenomenon in which a boundary portion between a monocular region and a binocular region becomes noticeable, and thus the user cannot naturally conduct observation. This phenomenon arises when a black portion such as a non-display portion of a panel is visually recognized although the image is visible on only one side of the eyes because of the binocular rivalry between the right and the left eyes.

With respect to the above-described phenomenon, Japanese Patent Application Laid-Open No. 2003-337299 discusses a technique for making a black portion unnoticeable by lowering the luminance of an image displayed on an HMD apparatus from a predetermined position at a predetermined lowering rate.

In the technique described in Japanese Patent Application Laid-Open No. 2003-337299, linear gradation is executed to make the black portion unnoticeable, and a boundary portion of the gradation has a rectilinear shape. On the contrary, with respect to an actual image visually recognized by the eyes of a person who does not wear the HMD, the black portion does not provide a sense of discomfort, and the image can be observed as a wide-angle image although a boundary portion between the monocular region and the binocular region also exists. In other words, in order to make the black portion of the gradation unnoticeable as much as possible, a flexible configuration capable of making a shape of a gradation boundary portion close to a shape of the boundary portion actually seen by the human eyes is provided.

SUMMARY OF THE INVENTION

According to an aspect of the embodiments, an image processing apparatus which executes gradation processing for applying a gradient to a luminance value in a first direction of an image includes a determination unit configured to determine start positions for starting the gradation processing in a plurality of positions in a second direction, and a correction unit configured to execute the gradation processing in the first direction based on the determined start positions.

Further features of the disclosure will become apparent from the following description of exemplary embodiments with reference to the attached drawings.

BRIEF DESCRIPTION OF THE DRAWINGS

FIG. 2 is a schematic diagram illustrating a general configuration of a mixed reality (MR) system according to the first exemplary embodiment.

FIGS. 6A and 6B are flowcharts illustrating details of the gradation processing according to the first exemplary embodiment.

FIGS. 15A and 15B are flowcharts illustrating details of the gradation processing according to the third exemplary embodiment.

FIGS. 16A and 16B are diagrams illustrating moderation of image deterioration according to the third exemplary embodiment.

FIGS. 18A and 18B are flowcharts illustrating the gradation processing according to the fourth exemplary embodiment.

DESCRIPTION OF THE EMBODIMENTS

Figure 1A:
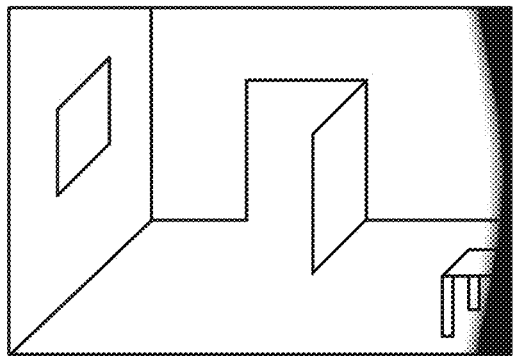
FIGS. 1A, 1B, and 1C are diagrams schematically illustrating gradation processing according to a first exemplary embodiment.
Figure 1B:
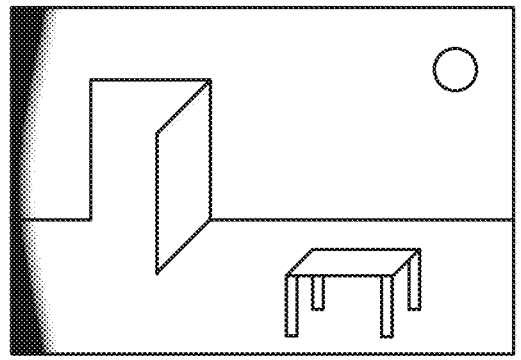
Figure 1C:
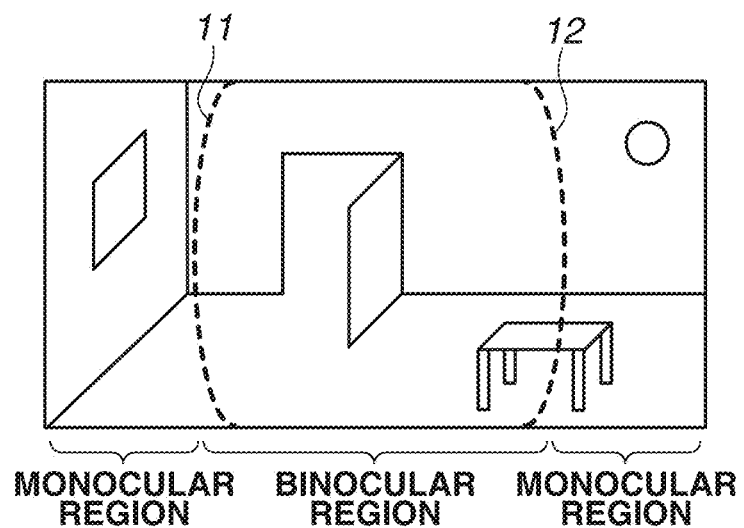

A first exemplary embodiment will be described with reference to the appended drawings. A general outline of gradation processing as characteristic processing of the present exemplary embodiment will be described with reference to FIGS. 1A, 1B, and 1C. FIGS. 1A and 1B are diagrams respectively illustrating a left-eye display image and a right-eye display image, and regions having the same view angle are superimposed and observed through the both eyes. In the present exemplary embodiment, the gradation processing is executed on a right edge of the left-eye display image (FIG. 1A) and a left edge of the right-eye display image (FIG. 1B), so that boundary portions thereof are respectively formed into eyelid-like curvilinear shapes. When a user wearing the HMD observes the display images through the both eyes, the images are combined in the user's head to become a both-eye display image as illustrated in FIG. 1C. In the present exemplary embodiment, in a boundary portion between an overlapping region (binocular region) of the left-eye and right-eye images and a monocular region, image processing for gradually applying a luminance gradient is executed in order to minimize the binocular rivalry between the right and left eyes which is caused by a steep luminance difference (gradient) arising in a non-display black portion of the display apparatus. Further, image processing for forming a boundary portion into an eyelid-like curvilinear shape is executed in order to make an observation state of the display image close to a state where the real space is visually recognized by the actual human eyes, and to eliminate a sense of discomfort at a boundary portion. Through the above-described processing, in the present exemplary embodiment, an effect of making boundary portions 11 and 12 unnoticeable can be acquired.

A configuration example of the MR system including a head-mounted display apparatus (herein, referred to as "HMD") according to the present exemplary embodiment will be described with reference to FIG. 2. As illustrated in FIG. 2, the MR system includes an HMD 200 which provides an image of a mixed reality space that is a combined space of a real space and a virtual space in front of the user's eyes, and a computer apparatus 250 which generates and provides the image of the mixed reality space to the HMD 200. Further, the HMD 200 and the computer apparatus (image processing apparatus) 250 are connected to each other through a cable 240. Although the MR system executes communication through a wired communication path using the cable 240, the communication may be executed through a wireless communication path.

A configuration of the HMD 200 will be described in detail. The HMD 200 is a video see-through head-mounted display apparatus which includes cameras (a right-eye camera 20R and a left-eye camera 20L) for capturing real space images to be combined with virtual space images when a mixed reality space image is generated.

Further, the images captured by the cameras 20R and 20L are used for acquiring a position and an orientation of the HMD 200. The computer apparatus 250 can calculate a position and an orientation of the HMD 200 from a captured image of a marker 210 arranged in the real space by executing known processing.

Specifically, the computer apparatus 250 uses the image captured by the left-eye camera 20L to calculate the position and the orientation of the left-eye camera 20L, and uses the image captured by the right-eye camera 20R to calculate the position and the orientation of the right-eye camera 20R. Then, based on the positions and the orientations of the cameras 20R and 20L, the computer apparatus 250 generates the virtual space images viewed from the positions and the orientations of the cameras 20R and 20L, and combines the virtual space images and the real space images captured by the cameras 20R and 20L to generate a mixed reality space image.

More precisely, a virtual space image viewed from the position and the orientation of the left-eye camera 20L is generated based on the position and the orientation of the left-eye camera 20L, and the generated virtual space image is combined with a real space image captured by the left-eye camera 20L. With this processing, a mixed reality space image provided to the user's left eye is generated. Similarly, a virtual space image viewed from the position and the orientation of the right-eye camera 20R is generated based on the position and the orientation of the right-eye camera 20R, and the generated virtual space image is combined with a real space image captured by the right-eye camera 20R. With this processing, a mixed reality space image provided to the user's right eye is generated. Then, the computer apparatus 250 outputs the generated mixed reality space images (i.e., the mixed reality space images for the right and the left eyes) to the HMD 200.

Figure 3:
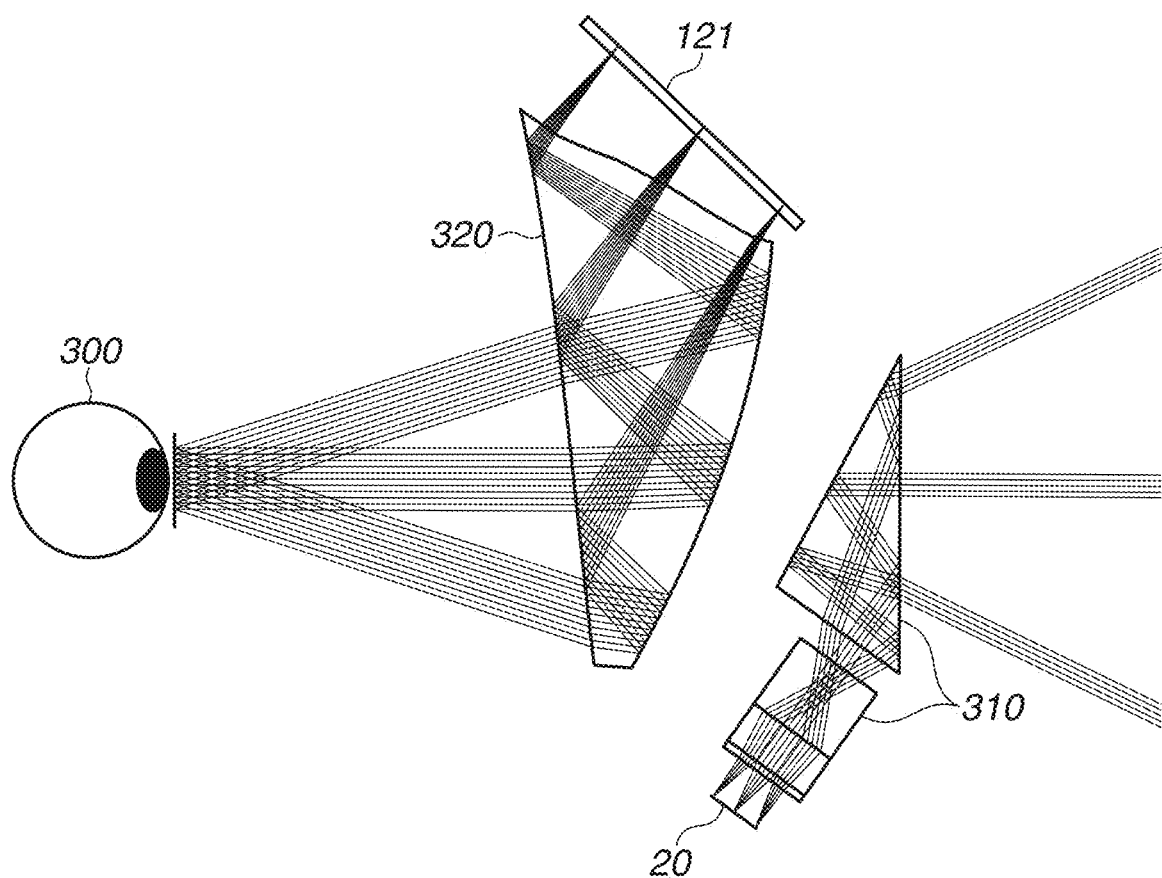
FIG. 3 is a schematic diagram illustrating a hardware configuration of a head-mounted display (HMD) according to the first exemplary embodiment.

FIG. 3 is a schematic diagram illustrating a hardware configuration of the HMD 200. Because the HMD 200 consists of a pair of constituent elements for the right eye and the left eye, the constituent elements for only one side of the eyes are illustrated in FIG. 3. The HMD 200 includes a display element 121 configured of a right-eye (left-eye) display such as a small-sized liquid crystal display or an organic EL display, and a display optical system 320 such as a free-form surface prism for enlarging and displaying a right-eye (left-eye) image displayed on the display element 121. Further, the HMD 200 includes a camera 20 for capturing an object image substantially conforming to the object observed from a position of a user's pupil 300 and an imaging optical system 310 for making positions of the pupil 300 and the camera 20 substantially conform to each other.

Figure 4A:
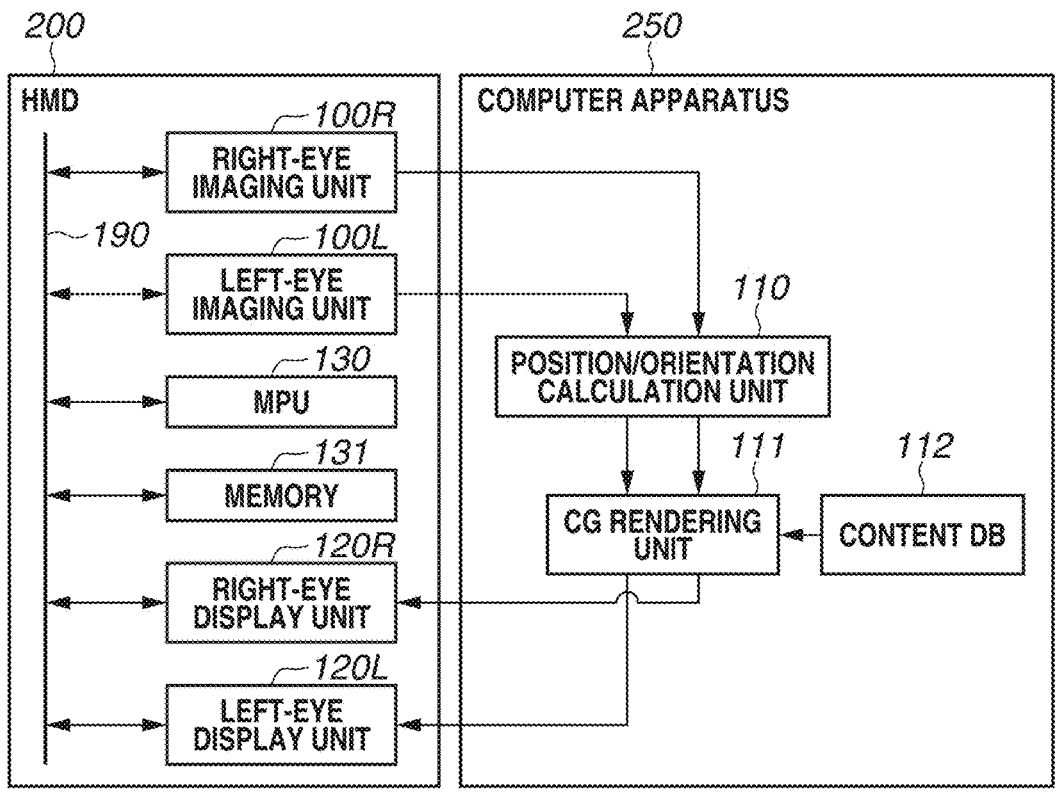
FIGS. 4A, 4B, and 4C are block diagrams illustrating a hardware configuration of the MR system according to the first exemplary embodiment.
Figure 4B:
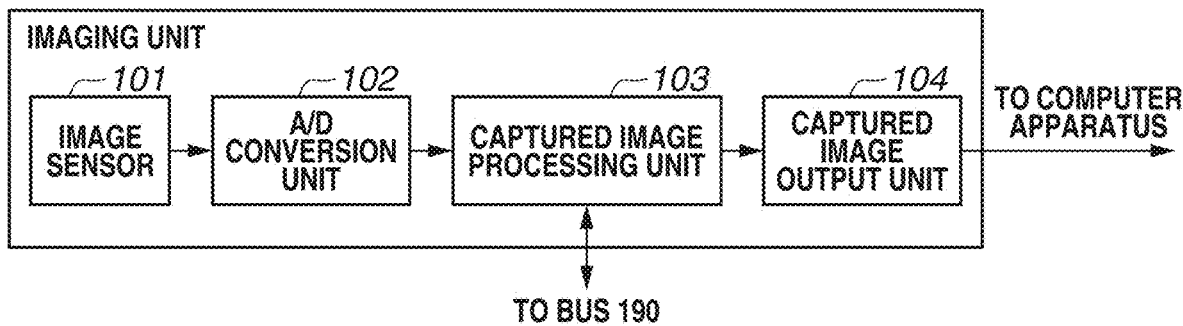
Figure 4C:
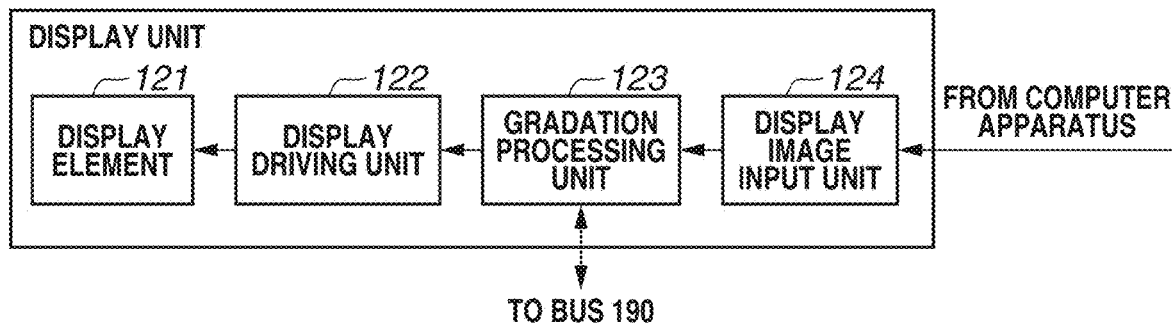

FIGS. 4A to 4C are block diagrams illustrating a hardware configuration of the MR system, and the hardware configuration of the HMD 200 is illustrated in FIG. 4A. A right-eye imaging unit 100R includes the right-eye camera 20R, an optical system of the right-eye camera 20R, and various processing circuits for the right-eye camera 20R. Similarly, a left-eye imaging unit 100L includes the left-eye camera 20L, an optical system of the left-eye camera 20L, and various processing circuits for the left-eye camera 20L.

A micro processing unit (MPU) 130 executes processing by using a computer program or data stored in a memory 131 included in the HMD 200, so as to execute operation control of the above-described respective function units connected to a bus 190 and operation control of the entirety of the HMD 200. The memory 131 stores a computer program or data that causes the MPU 130 to execute respective pieces of the following processing and the information that is described below as known information. Herein, the memory 131 also includes a memory having a work area used by the MPU 130 when the respective pieces of processing are executed.

A configuration example of an imaging unit applicable to the right-eye imaging unit 100R and the left-eye imaging unit 100L is illustrated in FIG. 4B. An image sensor 101 may be a charge-coupled device (CCD) image sensor, which converts an external light into an analog electric signal to output the analog electric signal, and an analog/digital (A/D) conversion unit 102 converts the analog electric signal output from the image sensor 101 into a digital electric signal. A captured image processing unit 103 executes various kinds of image processing with respect to the digital electric signal converted by the A/D conversion unit 102, and generates and outputs a captured image on which the image processing has been executed. The above image processing includes shading correction, noise reduction processing, contour emphasis processing, and gain adjustment processing with respect to various color signals for making luminance or hue of the right and left captured images become uniform, although they are not described below. A captured image output unit 104 outputs the captured image on which image processing has been executed by the captured image processing unit 103 to the computer apparatus 250 in an appropriate image format.

Referring back to FIG. 4A, a right-eye display unit 120R is mounted on the HMD 200 so as to position in front of the right eye of the user who wears the HMD 200, and displays a mixed reality space image for the right eye generated by the computer apparatus 250. Similarly, a left-eye display unit 120L is mounted on the HMD 200 so as to position in front of the left eye of the user who wears the HMD 200, and displays a mixed reality space image for the left eye generated by the computer apparatus 250.

Herein, description will be given to a configuration which allows the computer apparatus 250 to superimpose a CG applicable to each of the right and the left captured image signals. The computer apparatus 250 includes a position/orientation calculation unit 110 for calculating the position and the orientation of the HMD 200 from the captured image received from the HMD 200, and a content database (DB) 112 for storing CG content of a virtual image. Further, the computer apparatus 250 includes a CG rendering unit 111 for superimposing a CG image stored in the content DB 112 onto captured images captured by the imaging units 100R and 100L, and the other functional units (not illustrated).

The computer apparatus 250 calculates a position and an orientation of the camera 20 using a captured image. Specifically, the computer apparatus 250 detects a marker from the captured image through image analysis, and acquires information such as a size, a shape, and a fill pattern of the detected marker. Then, based on the information acquired from detection of the marker, the computer apparatus 250 calculates three-dimensional position and orientation information about a relative positional relationship between the marker and the HMD 200 and a direction of the user who observes the marker by wearing the HMD 200. As described above, by defining positional relationships of the markers as index arrangement information using a plurality of markers, the observation direction of the markers can be calculated from relative position information of the markers. Accordingly, for example, instead of using a marker capable of identifying a direction from a fill pattern provided inside thereof, a marker having one-dimensional information that has no directional information, which is included in a color marker or a light-emitting element such as a light-emitting diode (LED), can be used.

Figure 8:
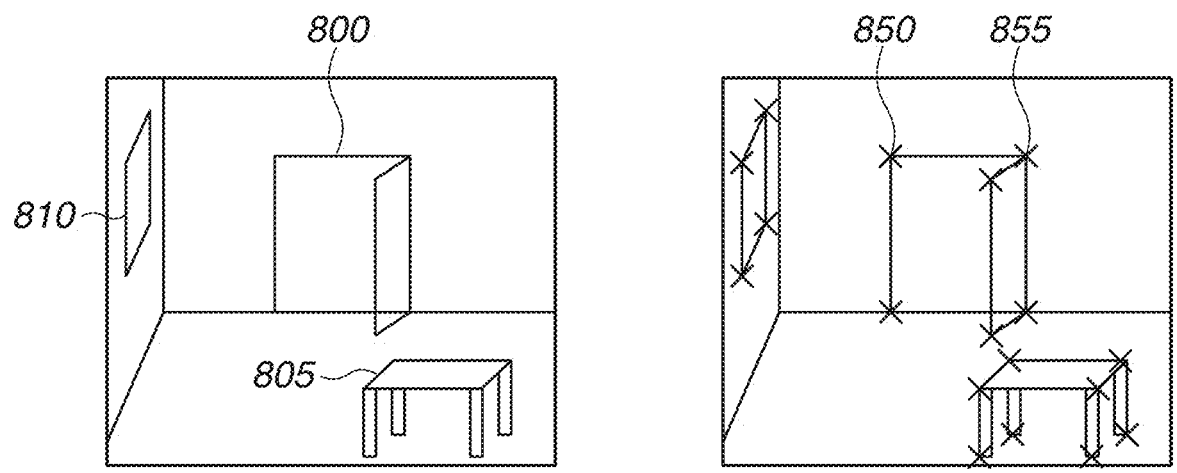
FIG. 8 is a diagram illustrating an example of a feature quantity extracted from a captured image in the first exemplary embodiment.

FIG. 8 is a diagram illustrating an example of a feature amount extracted from a captured image according to the present exemplary embodiment. In the present exemplary embodiment, as illustrated in FIG. 8, information such as natural features in an image, i.e., contour lines of a door 800, a table 805, and a window 810, or specific colors in the image are extracted instead of markers, and the three-dimensional position and orientation information can be calculated using such information. In FIG. 8, symbols "x" represent a part of feature points 850 and 855 of the door 800. By using a plurality of markers of the same type or different types, or by using marker information and information about feature points in the image in combination with each other, three-dimensional position and orientation information can be generated with higher precision. Then, the computer apparatus 250 outputs a mixed reality space image on which a CG image has been superimposed by the CG rendering unit 111 to the display unit 120 in an appropriate image format.

A configuration example of a display unit applicable to the right-eye display unit 120R and the left-eye display unit 120L is illustrated in FIG. 4C. A display image input unit 124 receives the mixed reality space image output from the computer apparatus 250 and converts the received mixed reality space image into a display image signal. A gradation processing unit 123 executes the below-described gradation processing according to the present exemplary embodiment with respect to each of the right and left display image signals and transfers the display image signals to a display driving unit 122. The display driving unit 122 drives the display element 121 to display the display image on which the gradation processing has been executed. With the above-described configuration, the user can experience the mixed reality space in which the real space and the virtual space are seamlessly combined with each other on a real-time basis by wearing the HMD 200 on user's own head.

The gradation processing to be executed by the gradation processing unit 123 will be described in detail. Hereinafter, processing executed with respect to a left-eye display image displayed on the left-eye display unit 120L will be described. In addition, the processing with respect to the right-eye display image displayed on the right-eye display unit 120R is symmetrical and similar to the processing with respect to the left-eye display image, and thus description thereof will be omitted. In the present exemplary embodiment, it is assumed that image data displayed by the display element 121 supports a full high definition (HD) and has a size of 1920 horizontal pixels and 1080 vertical pixels (1920× 1080).

Figure 5:
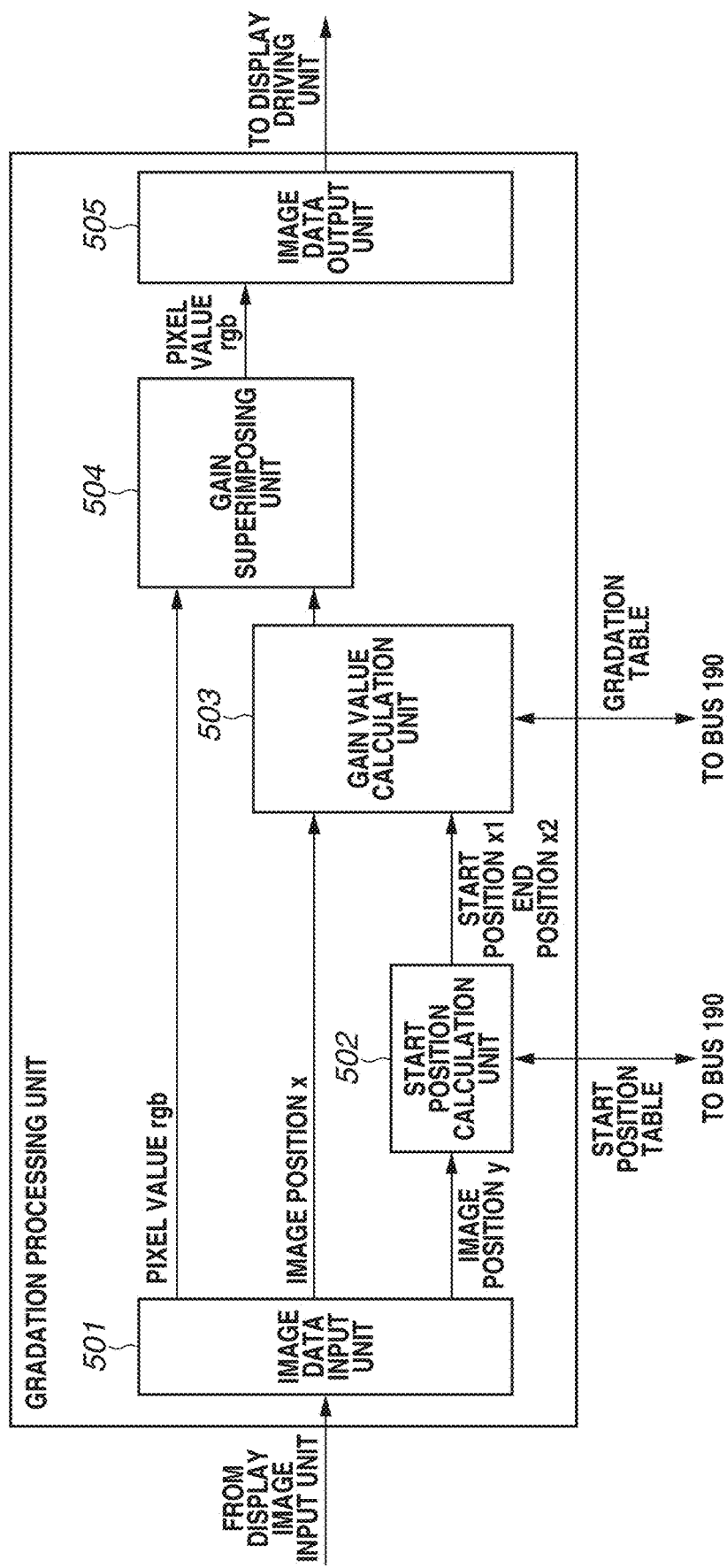
FIG. 5 is a block diagram of a gradation processing unit according to the first exemplary embodiment.

FIG. 5 is a block diagram illustrating details of respective function units included in the gradation processing unit 123 according to the present exemplary embodiment. In order to process the display image signals received from the display image input unit 124 at each pixel, an image data input unit 501 calculates and transfers pixel values r, g, and b and image positions (information) x and y of each pixel to the next processing blocks. Each of the image positions (information) x and y is an integer which takes an upper left display image position as an origin 1, which specifies a pixel position in a lateral direction (horizontal direction) of the image corresponding to a first direction and a longitudinal direction (vertical direction) thereof corresponding to a second direction according to the present exemplary embodiment. Further, the pixel values r, g, and b respectively represent luminance values of red, green, and blue of the display image, each of which normally takes an integer value within a range of 0 to 255.

A start position calculation unit 502 calculates positions of starting and ending the gradation processing at each of the positions in the vertical direction of an image. FIGS. 6A and 6B are flowcharts illustrating details of the gradation processing according to the present exemplary embodiment, and the flowchart in FIG. 6A illustrates processing for calculating a start position executed by the start position calculation unit 502.

Figure 7A:
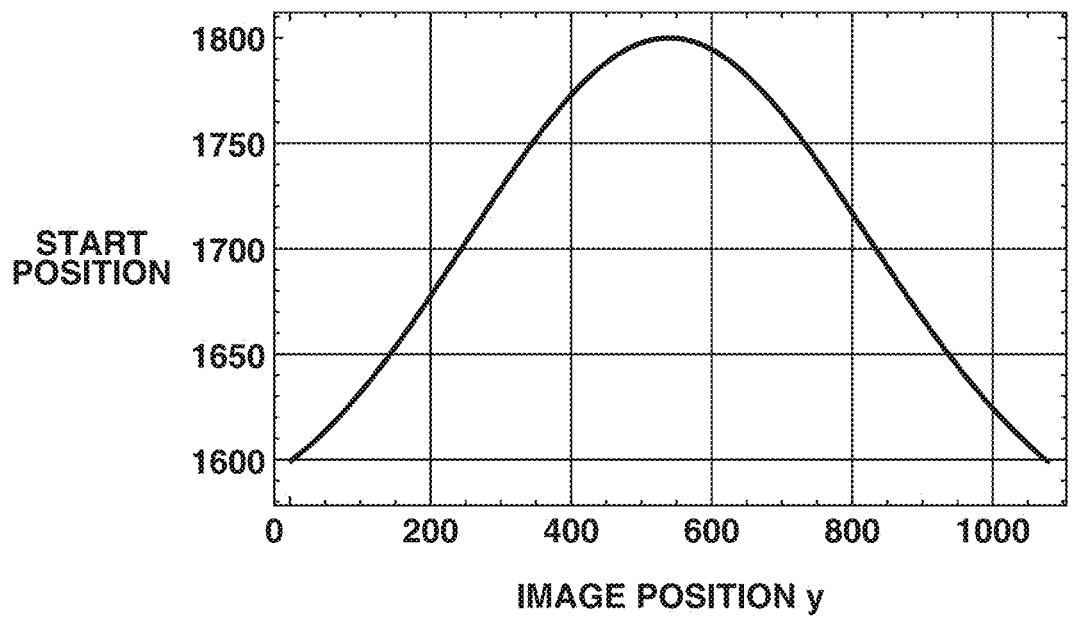
FIGS. 7A and 7B are diagrams illustrating profiles of one-dimensional tables used for the gradation processing according to the first exemplary embodiment.
Figure 7B:
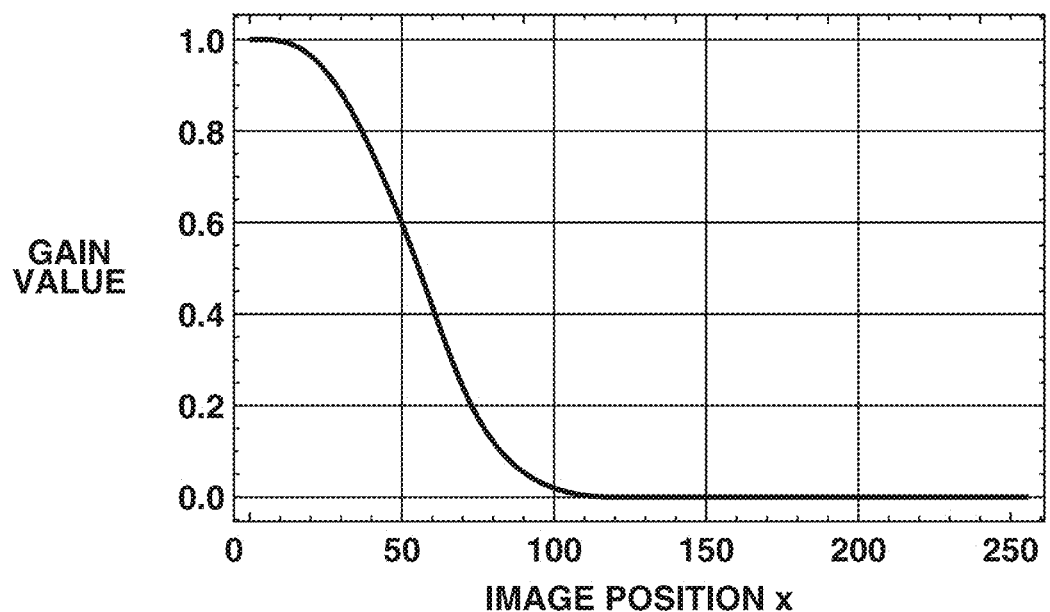

In step S601, the start position calculation unit 502 refers to a start position table startTbl stored in the memory 131 via the bus 190. The start position table startTbl is table data in which the image position x for starting the gradation processing is specified with respect to the image position y. FIGS. 7A and 7B are diagrams illustrating profiles of one-dimensional tables used in the gradation processing, and a profile of the start position table is illustrated in FIG. 7A. In a profile, a shape of a boundary portion for starting gradation is designed to make a black portion that can be visually recognized in the boundary portion between the monocular region and the binocular region become unnoticeable, and FIG. 7A illustrates one example of the profile.

In step S602, the start position calculation unit 502 determines a start position "x1" of the gradation processing from the image position y according to the following formula 1.

$$x1 = \text{startTbl}(y) \quad \text{Formula 1}$$

In step S603, the start position calculation unit 502 refers to a size "sizeTbl" of a below-described gradation table "gradTbl" stored in the memory 131 via the bus 190.

In step S604, the start position calculation unit 502 calculates an end position "x2" of the gradation processing through the following formula 2.

$$x2 = x1 + \text{sizeTbl} \quad \text{Formula 2}$$

Through the above-described processing flow, a range of the image position x for executing the gradation processing in the image position y (i.e., the start position x1 and the end position x2) is determined by the start position calculation unit 502.

The gain value calculation unit 503 receives the start position x1 and the end position x2 calculated by the start position calculation unit 502 of the previous processing block, and calculates and determines a gain value as gradation (i.e., increase-decrease coefficient), by which the display image is multiplied. FIG. 6B is a flowchart illustrating specific processing executed by the gain value calculation unit 503.

In step S611, the gain value calculation unit 503 determines whether the image position x is equal to or greater than the start position x1. When the image position x is not greater than the start position x1 (x<x1) (NO in step S611), the image position x is determined as a position outside of the range of the gradation processing (left-side image region), so that the processing proceeds to step S615. On the other hand, when the image position x is equal to or greater than the start position x1 (x1≤x) (YES in step S611), the image position x is determined as a position inside of the range of the gradation processing, so that the processing proceeds to next determination processing in step S612.

In step S612, the gain value calculation unit 503 determines whether the image position x is less than the end position x2. If the image position x is equal to or greater than the end position x2 (x2≤x) (NO in step S612), the image position x is determined as a position outside of the range of the gradation processing (right-side image region), so that the processing proceeds to step S617. On the other hand, if the image position x is less than the end position x2 (x<x2) (YES in step S612), the image position x is determined as a position inside of the range of the gradation processing, so that the processing proceeds to step S613.

In step S613, the gain value calculation unit 503 refers to the gradation table gradTbl stored in the memory 131 via the bus 190. The gradation table gradTbl is data in a format in which a gain value by which a display image in an image position x' is multiplied is specified by making the starting point as an origin, and a profile thereof is illustrated in FIG. 7B. In the profile, a shape of gradation for reducing the luminance of the display image is designed to make a black portion that can be visually recognized in the boundary portion between the monocular region and the binocular region become unnoticeable, and FIG. 7B illustrates one example of the profile.

In step S614, the gain value calculation unit 503 determines a gain value "gain" of the gradation from the image position x according to the following formula 3.

$$\text{gain} = \text{gradTbl}(x - x1) \quad \text{Formula 3}$$

Processing in step S615 is executed when the image position x is a position outside of the range of the gradation processing (left-side image region x<x1), and the gain value calculation unit 503 refers to a left-end gain value gainL stored in the memory 131 via the bus 190. A predetermined gain value appropriate for the left-side image region where the gradation processing is not to be executed is set as the left-end gain value gainL. Specifically, for example, the left-end gain value gainL is set as 1 (gainL=1) with respect to the left-eye display image because the image is displayed as it is, whereas the left-end gain value gain L is set as 0 (gainL=0) with respect to the right-eye display image because the image should conform to the black portion of the non-display region of the display apparatus.

In step S616, the gain value calculation unit 503 determines the gain value "gain" according to the following formula 4.

$$\text{gain} = \text{gainL} \quad \text{Formula 4}$$

Processing in step S617 is executed when the image position x is a position outside of the range of the gradation processing (right-side image region x2≤x), and the gain value calculation unit 503 refers to a right-end gain value gainR stored in the memory 131 via the bus 190. A predetermined gain value appropriate for the right-side image region where the gradation processing is not to be executed is set as the right-side gain value gainR. Specifically, for example, the right-end gain value gainR is set as 0 (gainR=0) with respect to the left-eye display image because the image should conform to the black portion of the non-display region of the display apparatus, whereas the right-end gain value gainR is set as 1 (gainR=1) with respect to the right-eye display image because the image is displayed as it is.

In step S618, the gain value calculation unit 503 determines the gain value "gain" according to the following formula 5.

$$\text{gain} = \text{gainR} \quad \text{Formula 5}$$

Through the above-described processing flow, the gain value calculation unit 503 determines the gain value as gradation, by which the display image in the image positions x and y is multiplied.

A gain superimposing unit 504 executes processing for multiplying the pixel values r, g, and b by the gain value determined by the gain value calculation unit 503. In the present exemplary embodiment, although all of the pixel values r, g, and b are multiplied by the same gain value, the exemplary embodiment is not limited thereto, and each of the pixel values r, g, and b may be multiplied by different gain values. In this case, the gain value calculation unit 503 has to determine the gain values with respect to each of the pixel values r, g, and b. For example, when the black portion in the non-display region of the display apparatus has a slightly reddish color instead of black, a gain value for the pixel value r may be set to be slightly greater than the gain values for the pixel values g and b.

An image data output unit 505 re-combines the pixel values r, g, and b, of each pixel received from the gain superimposing unit 504 as a display image signal, and transfers the display image signal to the display driving unit 122 as a next processing block.

As described above, according to the configuration of the present exemplary embodiment, the gradation processing can be executed according to various shapes of the boundary portions. Further, with the configuration of the present exemplary embodiment, a boundary shape of gradation and a reduction rate of the luminance gradient can be set with high flexibility through a simple calculation method with a small calculation amount using table data of a small size.

Therefore, through the gradation processing as described above, gradation with an appropriate variation in the reduction rate of the luminance can be applied to the right-eye display image and the left-eye display image in the left-end and the right-end regions thereof, so that the black portions in a vicinity of the boundary between the monocular region and the binocular region becomes unnoticeable. Further, the display image is created so as to have gradation with an appropriate curvilinear boundary. As described above, in the present exemplary embodiment, it is possible to make the black portion of gradation unnoticeable as much as possible.

In the present exemplary embodiment, the gradation processing unit 123 is provided on the display units 120R and 120L of the HMD 200, and the HMD 200 functions as an image processing apparatus that executes the gradation processing. However, for example, various kinds of image processing including the gradation processing may be executed by the computer apparatus 250. In this case, the computer apparatus 250 connected to the HMD 200 functions as the image processing apparatus that executes the gradation processing of the present exemplary embodiment.

Further, in the above-described exemplary embodiment, a start position table or a gradation table of one type is illustrated. However, for example, by storing a plurality of start position tables or gradation tables, processing of applying gradation in different curvilinear shapes can be executed according to the users.

Furthermore, in the above-described exemplary embodiment, gradation processing has been described as image processing that is to be executed with respect to a right-eye display image and a left-eye display image of an HMD. However, the processing targets thereof are not limited to display images of an HMD, but may be images captured by a camera or display images of another display apparatus such as a projector apparatus. A number of images as the targets of the gradation processing may be one or more.

Moreover, in the present exemplary embodiment, in order to make a boundary portion of gradation be a curvilinear shape, one-dimensional profile tables are used for specifying a predetermined luminance gradient shape and a predetermined boundary shape. However, if an additional capacity can be provided to the memory 131 or the number of pieces of stored grid data can be reduced through two-dimensional interpolation calculation, the boundary shape and the luminance gradient shape of the gradation may be collectively specified and corrected through a two-dimensional table.

<Variation Example>

Figure 9:
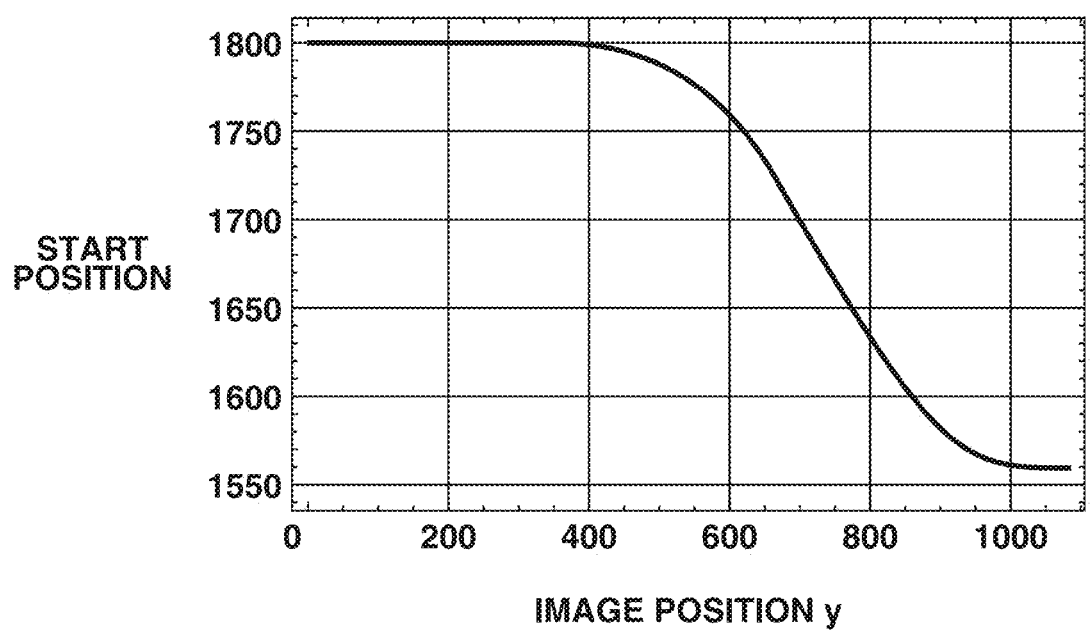
FIG. 9 is a diagram illustrating a variation example of a start position table according to the first exemplary embodiment.

In the above-described first exemplary embodiment, by using the start position table in FIG. 7A, a boundary of gradation is formed into an eyelid-like curvilinear shape. However, the shape thereof is not limited to the above, and the boundary may be formed into another shape. FIG. 9 is a diagram illustrating a variation example of a start position table, and FIGS. 10A, 10B, and 10C are diagrams schematically illustrating the gradation processing using such start position table.

Figure 10A:
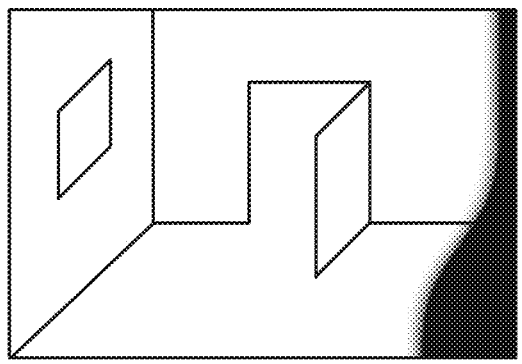
FIGS. 10A, 10B, and 10C are diagrams illustrating a variation example of the gradation processing according to the first exemplary embodiment.
Figure 10B:
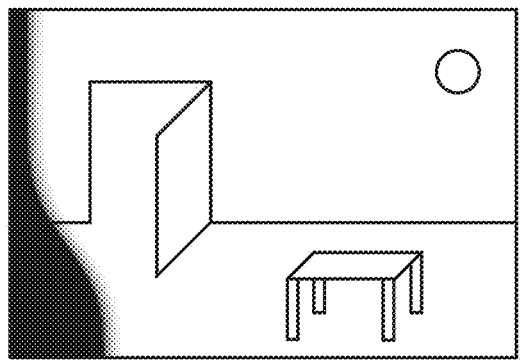
Figure 10C:
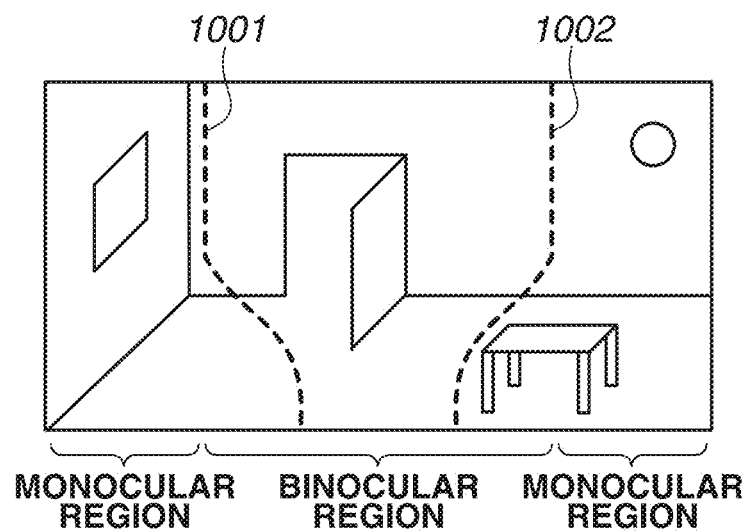

With the profile of the start position table illustrated in FIG. 9, a boundary portion of gradation can be formed into a nose-like shape as illustrated in FIGS. 10A to 10C. Further, as another variation example of the profile of the start position table, a profile can be designed to form a boundary having a combined shape of the eye-lid like shape in FIG. 7A and the nose-like shape in FIG. 9. In any of the cases, through the above-described configuration of the present exemplary embodiment, a boundary of gradation can be formed into a curvilinear shape in a part of the image in the vertical direction, and thus the boundary can be set with high flexibility.

In the first exemplary embodiment, in order to reduce the calculation amount of the gradation processing, a start position for specifying a shape of the boundary and a gain value for specifying a luminance gradient of gradation are respectively stored as one-dimensional tables, and a data reference method which can be performed through simple calculation is employed. In a second exemplary embodiment of the disclosure, a calculation parameter for the gradation processing is changed to a model calculation method using a simple model formula from the one-dimensional table method, so that sizes of various types of data for the gradation processing can be reduced. In addition, the same reference numerals are applied to the configurations already described in the first exemplary embodiment, and description thereof will be omitted.

Figure 11:
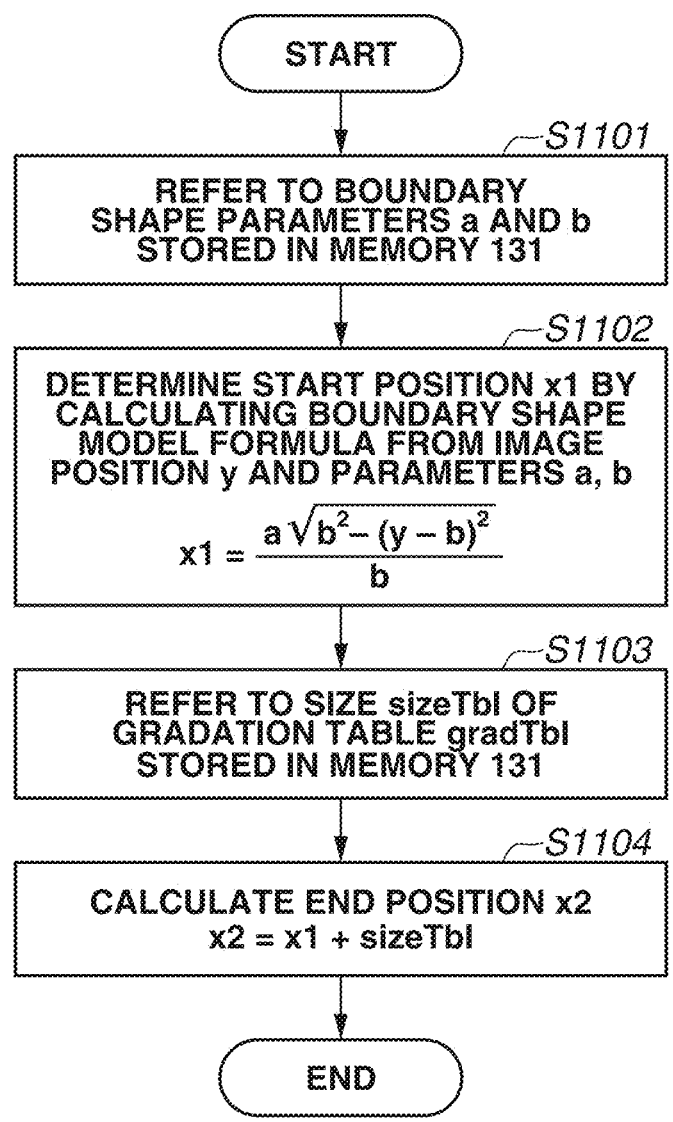
FIG. 11 is a flowchart illustrating processing of determining a start position according to a second exemplary embodiment.

FIG. 11 is a flowchart illustrating processing for calculating (determining) a start position executed by the start position calculation unit 502 according to the present exemplary embodiment.

In step S1101, the start position calculation unit 502 refers to boundary shape parameters "a" and "b" stored in the memory 131 via the bus 190. The boundary shape parameters "a" and "b" are calculation parameters of a boundary shape model formula described below, which are used for determining a shape of the boundary portion where gradation starts. Various shapes of gradation boundary can be realized by storing a plurality of parameters "a" and "b".

In step S1102, the start position calculation unit 502 determines a start position x1 of the gradation processing from the image position y through the following boundary shape model formula (Formula 6).

$$x1 = \frac{a\sqrt{b^2 - (y-b)^2}}{b} \qquad \text{Formula 6}$$

In the present exemplary embodiment, a profile is designed to form a gradation boundary having an elliptical shape, a variation of an ellipse equation is employed as the boundary shape model formula. However, the disclosure is not limited thereto, and a polynomial equation may be also used. In this case, a number of the calculation parameters and numerical values used in step S1101 may be changed according to the model formula to be used.

The processing in steps S1103 and S1104 is similar to the processing in steps S603 and S604 in FIG. 6A. Through the above-described series of processing, start positions of the gradation processing in respective positions in the vertical direction of the image can be determined.

Figure 12:
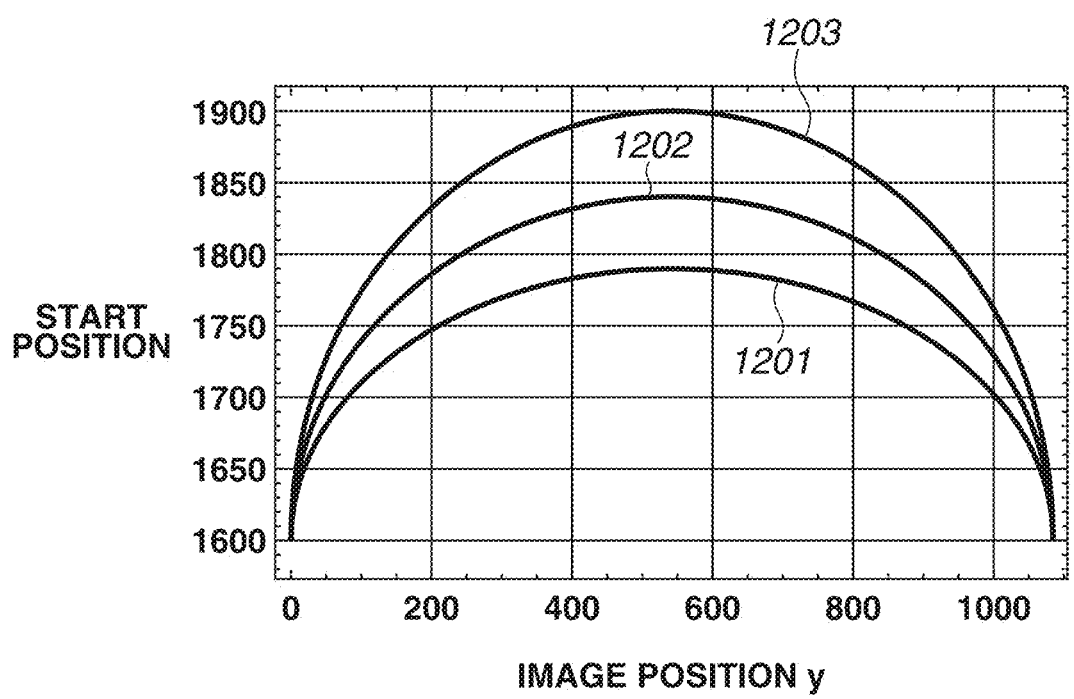
FIG. 12 is a diagram illustrating a relationship between a calculation parameter and a boundary shape model formula according to the second exemplary embodiment.

Now, a relationship between the calculation parameter and the boundary shape model formula will be described with reference to FIG. 12. In the profile illustrated in FIG. 12, the calculation parameter "b" is fixed to 540 which is a half of a value of the vertical size of the full HD, while setting values of the calculation parameter "a" are allocated. The shape profiles that draw curved lines of 1201, 1202, and 1203 are acquired when the calculation parameter "a" is 190 (a=190), 240 (a=240), and 300 (a=300), respectively.

As described above, in the gradation processing of the present exemplary embodiment, a shape of the gradation boundary can be determined using a simple model formula with data of a small size. Therefore, because the calculation parameters for specifying the boundary shape are reduced, the storage capacity of the memory 131 or the amount of data transmitted to the memory 131 from the external apparatus can be reduced.

Further, in the present exemplary embodiment, similar to the first exemplary embodiment, a table method of referring to a gradation table is employed as a calculation method of determining a gain value, by which the display image is multiplied, which is used for applying a luminance gradient to the display image in the gradation processing. However, the calculation method thereof may be also changed to a model calculation method from a table method. In other words, in steps S613 and S614 in FIG. 6B, when calculation for determining a gain value for applying the luminance gradient is executed using a simple model formula such as the boundary shape model formula, a size of data for specifying the profile can be reduced.

In the first exemplary embodiment, through the gradation processing in the lateral direction (horizontal direction) of the image corresponding to the first direction and calculation of the gradation processing start positions in the longitudinal direction (vertical direction) corresponding to the second direction, the black portion in a vicinity of the boundary between the monocular region and the binocular region has become unnoticeable. However, depending on a shape of the luminance gradient of gradation or specification content of the boundary shape, an image streak may be generated in a direction of the luminance gradient (i.e., the lateral direction of the image corresponding to the first direction) to cause an image quality situation such as image deterioration.

Figure 13A:
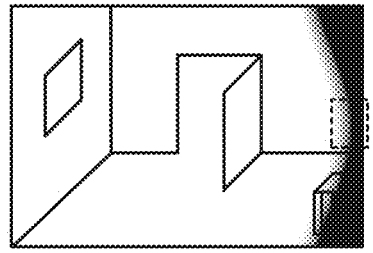
FIGS. 13A and 13B are diagrams illustrating image deterioration caused by generation of an image streak according to a third exemplary embodiment.
Figure 13B:
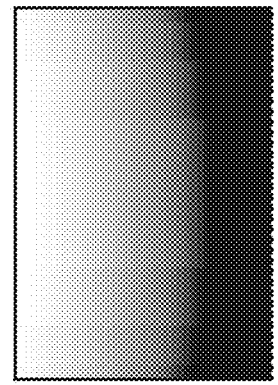

Generation of the image streak will be described with reference to FIGS. 13A and 13B. FIG. 13A is a diagram of the left-eye display image to which the image processing of the first exemplary embodiment is applied, and FIG. 13B is a diagram illustrating an enlarged portion of the image region on which the gradation processing has been executed. As illustrated in the enlarged image in FIG. 13B, an image streak is generated in the lateral direction (horizontal direction) of the image which is a direction the same as that of the luminance gradient of gradation. This is because the gradation shape of the same luminance gradient in the lateral direction (horizontal direction) of the image is uniformly applied with respect to the longitudinal direction (vertical direction) of the image, and thus the boundary shape may be noticeable as a large periodic band of gradation in the image region having a change of relatively moderate low frequency.

In a third exemplary embodiment of the disclosure, a gain value for the gradation processing with respect to the first direction is determined based on an average value of a plurality of gain values calculated from two or more different positions in the second direction. In addition, the same reference numerals are applied to the configurations already described in the first and the second exemplary embodiments, and description thereof will be omitted.

Figure 14:
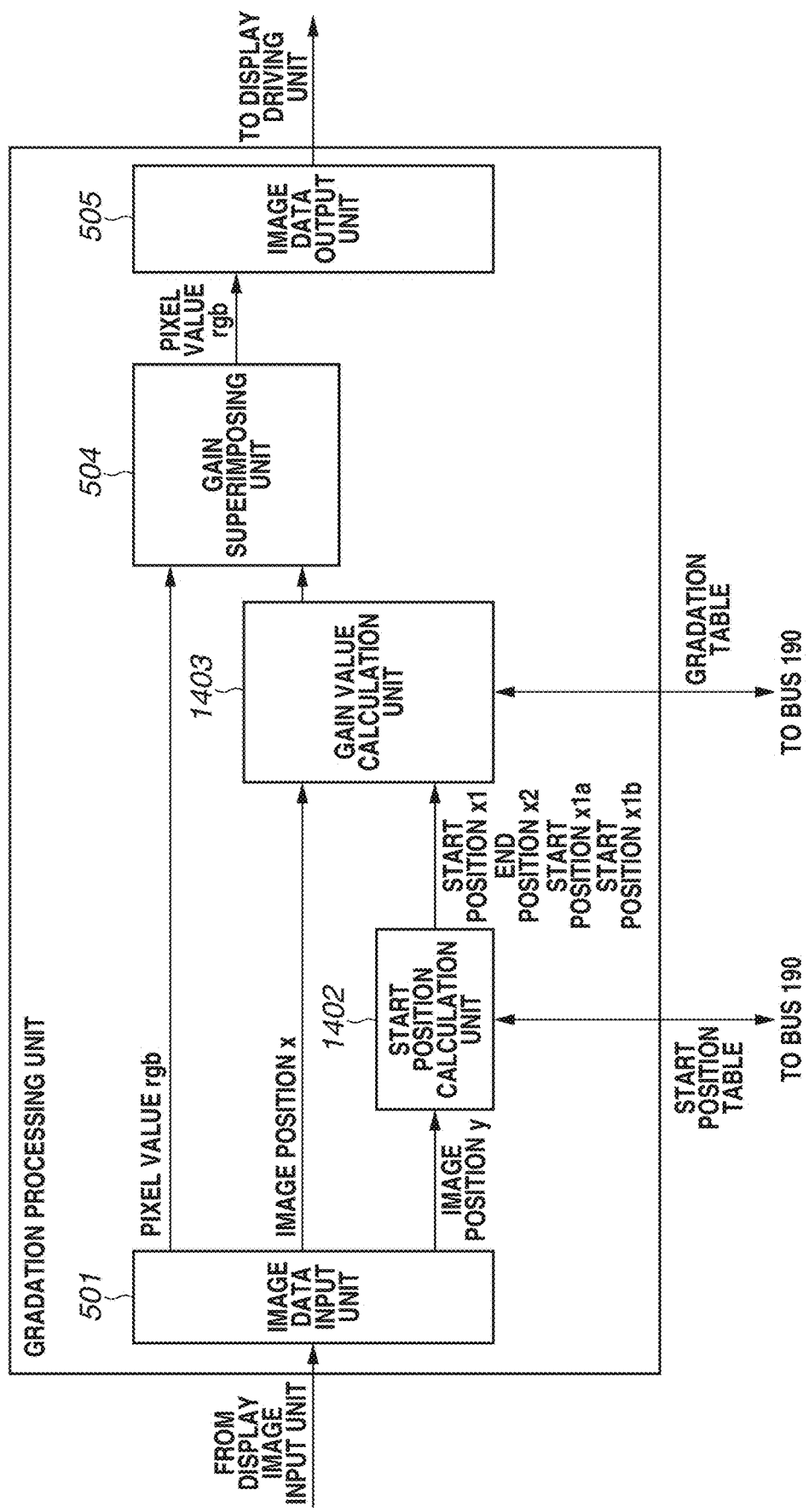
FIG. 14 is a block diagram illustrating a gradation processing unit according to the third exemplary embodiment.

FIG. 14 is a block diagram illustrating details of respective function units included in the gradation processing unit 123 according to the present exemplary embodiment. In each of the positions in the vertical direction of the image, a start position calculation unit 1402 calculates positions for starting and ending the gradation processing and positions used for averaging processing.

FIGS. 15A and 15B are flowcharts illustrating details of the gradation processing according to the present exemplary embodiment, and the flowchart in FIG. 15A illustrates processing for calculating a start position executed by the start position calculation unit 1402.

In step S1501, the start position calculation unit 1402 refers to averaging-target Y-relative positions "dya" and "dyb" stored in the memory 131 via the bus 190. Specifically, for example, values of the Y-relative positions dya and dyb may be $-1$ and $+1$ (i.e., dya=$-1$, dyb=$+1$), respectively.

In step S1502, the start position calculation unit 1402 determines averaging-target start positions "$x1a$" and "$x1b$" of the gradation processing from the image position y according to the following formulas 7 and 8.

$$x1a = \text{startTbl}(y+dya) \quad \text{Formula 7}$$

$$x1b = \text{startTbl}(y+dyb) \quad \text{Formula 8}$$

Through the processing flow according to the above-described exemplary embodiment, the start position x1 of the image position x for executing the gradation processing in the image position y and the start positions $x1a$ and $x1b$ used for the below-described averaging processing are determined by the start position calculation unit 1402.

A gain value calculation unit 1403 receives the start position x1, the end position x2, and the start positions $x1a$ and $x1b$ for the averaging processing calculated by the start position calculation unit 1402 of the previous processing block, and calculates to determine a gain value as gradation (i.e., increase-decrease coefficient), by which the display image is multiplied. FIG. 15B is a flowchart illustrating specific processing executed by the gain value calculation unit 1403.

In step S1513, the gain value calculation unit 1403 refers to averaging coefficients "w", "wa", and "wb" stored in the memory 131 via the bus 190. Specifically, for example, values of the averaging coefficients w, wa, and wb may be "1" (w=1, wa=1, and wb=1).

In step S1514, the gain value calculation unit 1403 determines the gain value "gain" of gradation from the image position x according to the following formula 9.

$$\text{gain} = (w \times \text{gradTbl}(x-x1) + wa \times \text{gradTbl}(x-x1a) + wb \times \text{gradTbl}(x-x1b))/(w+wa+wb) \quad \text{Formula 9}$$

As described above, in the present exemplary embodiment, the gain value calculation unit 1403 determines the gain value as the gradation in the image positions x and y, by which the display image is multiplied. Further, in the present exemplary embodiment, although the number of the averaging-target Y-relative positions different from the image position y used for determining the gain value is two, the number thereof is not limited thereto, and the number of the Y-relative positions may be one, or three or more. Further, in the present exemplary embodiment, although the averaging coefficients w, wa, and wb have the same weight (i.e., w=1, wa=1, and wb=1), different weights may be used, respectively (e.g., w=6, wa=5, and wb=5).

As described above, through the gradation processing according to the present exemplary embodiment, a gain value for the gradation processing with respect to the first direction can be determined by an average value of a plurality of gain values calculated from two or more different positions in the second direction.

FIGS. 16A and 16B are diagrams of the left-eye display image to which the image processing of the present exemplary embodiment is applied. Accordingly, by additionally executing the averaging processing of the present exemplary embodiment, it is possible to moderate image deterioration caused by an image streak generated as a band of gradation in the first exemplary embodiment.

In the above third exemplary embodiment, as a method of moderating the image deterioration caused by the image streak, a gain value for the gradation processing with respect to the first direction is determined by the average value of a plurality of gain values calculated from two or more different positions in the second direction. Therefore, a difference between gain values in the second direction corresponding to intensity of the image streak is distributed and moderated in the second direction through the averaging processing with respect to the second direction, so that the intensity of the image streak is weakened.

In a fourth exemplary embodiment of the disclosure, as a method of moderating the image deterioration caused by the image streak, description will be given to a method in which the image deterioration is moderated by randomly changing a boundary shape of the image streak in the first direction without cancelling the difference between gain values corresponding to the intensity of the image streak. In addition, the same reference numerals are applied to the configurations already described in the first to the third exemplary embodiments, and description thereof will be omitted.

Figure 17:
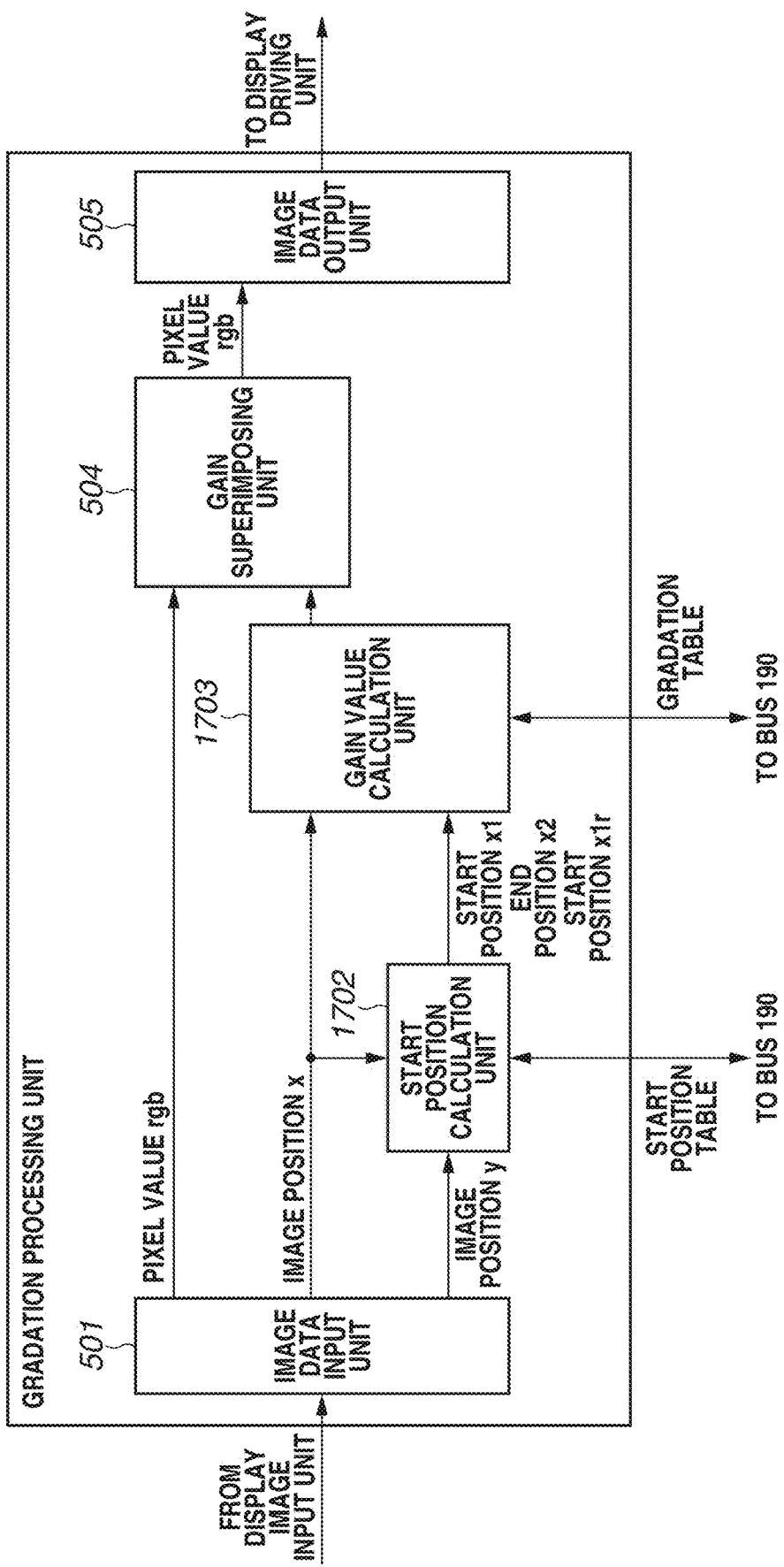
FIG. 17 is a block diagram illustrating a gradation processing unit according to a fourth exemplary embodiment.

FIG. 17 is a block diagram illustrating details of respective function units included in the gradation processing unit 123 according to the present exemplary embodiment. In each of the positions in the vertical direction and the lateral direction of an image, a start position calculation unit 1702 calculates a random position for determining positions of starting and ending the gradation processing and a gain value of the gradation.

FIGS. 18A and 18B are flowcharts illustrating details of the gradation processing of the present exemplary embodiment, and the flowchart in FIG. 18A illustrates processing for calculating the start position executed by the start position calculation unit 1702.

In step S1801, the start position calculation unit 1702 determines a Y-relative position "dy" for randomly changing a start position from the image position x according to the following formula 10.

$$dy = \mathrm{Random}(x \times y) \quad \text{Formula 10}$$

A function Random(z) is a function which outputs a random integer value by taking a value "z" as a seed value. Specifically, for example, two values such as 0 and 1 may be output. However, the configuration is not limited to the above. The output value may be three values or more, or may take a value range of a negative value. And, the seed value does not have to be a value of "x×y", but may be a value of time. Thus, any type of function or table reference-type processing may be employed as long as a random numerical value can be obtained as the output value.

In step S1802, the start position calculation unit 1702 determines a random start position "x1r" for the gradation processing from the image positions x and y according to the following formula 11.

$$x1r = \mathrm{startTbl}(y + dy) \quad \text{Formula 11}$$

Through the above-described processing flow according to the present exemplary embodiment, the start position x1 of the image position x for executing the gradation processing in the image positions y and x and the below-described random start position x1r are determined by the start position calculation unit 1702.

Then, a gain value calculation unit 1703 receives the start position x1, the end position x2, and the random start position x1r calculated by the start position calculation unit 1702 of the previous processing block, and calculates to determine a gain value (increase-decrease coefficient) as gradation by which the display image is multiplied. FIG. 18B is a flowchart illustrating specific processing executed by the gain value calculation unit 1703.

In step S1814, the gain value calculation unit 1703 determines the gain value "gain" of graduation from the image position x according to the following formula 12.

$$\mathrm{gain} = \mathrm{gradTbl}(x - x1r) \quad \text{Formula 12}$$

As described above, in the present exemplary embodiment, the gain value calculation unit 1703 determines the gain value as the gradation in the image positions x and y, by which the display image is multiplied. As described above, through the gradation processing of the present exemplary embodiment, a gain value for the gradation processing with respect to the first direction can be determined by superimposing a random change with respect to the first and the second positions.

Figure 19A:
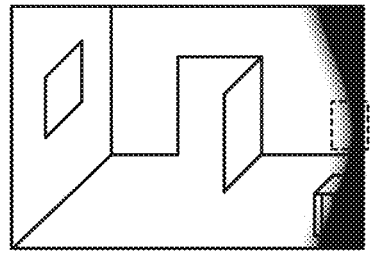
FIGS. 19A and 19B are diagrams illustrating moderation of image deterioration according to the fourth exemplary embodiment.
Figure 19B:
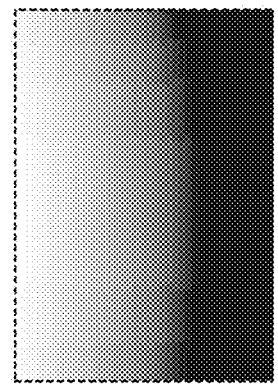

FIGS. 19A and 19B are diagrams of the left-eye display image to which the image processing of the present exemplary embodiment is applied. Accordingly, by additionally executing the random processing of the present exemplary embodiment, an image streak generated as a band of gradation and a boundary shape that is linear in the first direction are divided into a concavo-convex state. Through the above processing, in the present exemplary embodiment, a difference in gradation level of the image streak in the second direction is less likely to be visually recognized in a macro perspective, and thus the image deterioration is moderated.

According to the configuration of the present exemplary embodiment, it is possible to provide an image processing apparatus capable of executing gradation processing according to the various shapes of boundary portions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2016-099904, filed May 18, 2016, and No. 2017-027296, filed Feb. 16, 2017, which are hereby incorporated by reference herein in their entirety.

What is claimed is:

1. An image processing apparatus which executes gradation processing for applying a gradient to a luminance value in a first direction of an image, the image processing apparatus comprising:
   at least one processor; and
   a memory coupled to the at least one processor, the memory having instructions that, when executed by the processor, perform operations as:
   a determination unit configured to determine start positions for starting the gradation processing in a plurality of positions in a second direction; and
   a correction unit configured to execute the gradation processing so as to generate gradation from the determined start positions in the first direction of the image,
   wherein the determination unit determines the start positions with reference to table data in which the start positions are specified in the plurality of positions in the second direction or determines the start positions through calculation using a formula that specifies the start positions in the plurality of positions in the second direction, and
   wherein the table data and the formula are created based on at least one or more of eyelid-like shape and nose-like shape.

2. The image processing apparatus according to claim 1, wherein the table data is table data from one-dimensional table data.

3. The image processing apparatus according to claim 1, wherein the start positions for starting the gradation processing form a curvilinear shape in at least a part of the plurality of positions in the second direction.

4. The image processing apparatus according to claim 1, wherein the gradation processing is processing for applying the gradient to the luminance value by multiplying the luminance value of a pixel of the image by an increase-decrease coefficient.

5. The image processing apparatus according to claim 4, wherein the correction unit executes the gradation processing with reference to one-dimensional table data in which the increase-decrease coefficient is specified with respect to the first direction.

6. The image processing apparatus according to claim 4, wherein the correction unit executes the gradation processing through calculation using a formula that specifies the increase-decrease coefficient with respect to the first direction.

7. The image processing apparatus according to claim 4, wherein the increase-decrease coefficient is determined from a plurality of increase-decrease coefficients calculated from two or more start positions different from each other with respect to the second direction.

8. The image processing apparatus according to claim 7, wherein the increase-decrease coefficient is determined based on an average value of the plurality of increase-decrease coefficients.

9. The image processing apparatus according to claim 1, wherein the determination unit determines the start positions based on change values having no correlation with each other in the plurality of positions in the second direction.

10. The image processing apparatus according to claim 9, wherein the change values are random numbers.

11. The image processing apparatus according to claim 1, wherein the image includes a first captured image and a second captured image of a real space, and
    wherein each of the first captured image and the second captured image includes an overlapped region that is a region having a same view angle.

12. The image processing apparatus according to claim 11, wherein the first captured image and the second captured image are images corresponding to a right eye and a left eye respectively.

13. The image processing apparatus according to claim 11, wherein the correction unit executes gradation processing in the overlapped region.

14. The image processing apparatus according to claim 11, wherein the determination unit and the correction unit execute processing in a symmetrical manner with respect to the first captured image and the second captured image.

15. The image processing apparatus according to claim 1, wherein the first direction is a horizontal direction of the image, whereas the second direction is a vertical direction of the image.

16. The image processing apparatus according to claim 1, wherein the image processing apparatus is used by being mounted on a head of a user.

17. An image processing method for executing gradation processing for applying a gradient to a luminance value in a first direction of an image, the image processing method comprising:
    determining start positions for starting the gradation processing in a plurality of positions in a second direction; and
    executing the gradation processing so as to generate gradation from the determined start positions in the first direction of the image,
    wherein the determining determines the start positions with reference to table data in which the start positions are specified in the plurality of positions in the second direction or determines the start positions through calculation using a formula that specifies the start positions in the plurality of positions in the second direction, and
    wherein the table data and the formula are created based on at least one or more of eyelid-like shape and nose-like shape.

18. The image processing method according to claim 17, wherein the determining determines the start positions with reference to one-dimensional table data in which the start positions are specified in the plurality of positions in the second direction.

19. A non-transitory computer-readable storage medium storing a program for causing a computer to perform an image processing method for executing gradation processing for applying a gradient to a luminance value in a first direction of an image, the image processing method comprising:
- determining start positions for starting the gradation processing in a plurality of positions in a second direction; and
- executing the gradation processing so as to generate gradation from the determined start positions in the first direction of the image,
- wherein the determining determines the start positions with reference to table data in which the start positions are specified in the plurality of positions in the second direction or determines the start positions through calculation using a formula that specifies the start positions in the plurality of positions in the second direction, and
- wherein the table data and the formula are created based on at least one or more of eyelid-like shape and nose-like shape.

* * * * *